United States Patent [19]

Doane et al.

[11] Patent Number: 5,251,048
[45] Date of Patent: Oct. 5, 1993

[54] METHOD AND APPARATUS FOR ELECTRONIC SWITCHING OF A REFLECTIVE COLOR DISPLAY

[75] Inventors: J. William Doane; Deng-Ke Yang, both of Kent, Ohio

[73] Assignee: Kent State University, Kent, Ohio

[21] Appl. No.: 885,754

[22] Filed: May 18, 1992

[51] Int. Cl.$^5$ .......................... G02F 1/133; G09G 3/36
[52] U.S. Cl. ........................................ 359/51; 359/70; 359/56; 359/100; 345/88
[58] Field of Search ................. 359/51, 52, 54, 100, 359/70, 56, 84; 340/784, 765

[56] References Cited

U.S. PATENT DOCUMENTS

| | | | |
|---|---|---|---|
| 3,600,060 | 8/1971 | Churchill et al. | 359/51 |
| 3,603,984 | 9/1971 | Heilmeier et al. | 340/378 |
| 3,650,603 | 3/1972 | Heilmeier et al. | 359/85 |
| 3,703,331 | 11/1972 | Goldmacher et al. | 359/51 |
| 3,730,607 | 5/1973 | Grabmeier et al. | 359/101 |
| 3,781,085 | 12/1973 | Leibowitz | 359/84 |
| 3,840,695 | 10/1974 | Fischer | 359/54 |
| 3,985,427 | 10/1976 | Masi | 359/54 |
| 4,005,032 | 1/1977 | Haas et al. | 252/299 |
| 4,016,094 | 4/1977 | Tsukamoto et al. | 252/299 |
| 4,367,924 | 6/1983 | Clark et al. | 359/51 |
| 4,601,545 | 7/1986 | Kern | 359/38 |
| 4,664,480 | 5/1987 | Geary et al. | 359/102 |
| 4,834,508 | 5/1989 | Fergason | 359/68 |
| 4,878,741 | 11/1989 | Fergason | 359/68 |
| 5,103,328 | 4/1992 | Numao | 359/56 |
| 5,175,637 | 12/1992 | Jones et al. | 359/51 |

FOREIGN PATENT DOCUMENTS

998154 10/1976 Canada .
51-30998 3/1976 Japan .
8600436 9/1986 PCT Int'l Appl. .

OTHER PUBLICATIONS

Schadt, "Nematic Liquid Crystals and Electro-optic Effects: Display Applications," Chimia, vol. 41 (Oct. 1987).

Hitachi America Ltd., "HD44780, HD44780A, (LCD-II) (Dot Matrix Liquid Crystal Display Controller and Driver," in Hitachi LCD Controller/Driver LSI Databook, p. 98 (Aug. 1989).

Liquid Crystal Institute, Kent State University, "Practical Liquid Crystals" [Lecture Notes], pp. 3-1, 3-3 -3-5, 3-13 -3-16, 4-1, 4-10 -4-13 (May 30, 1990).

P. Collings, Liquid Crystals, pp. 100-102 (Princeton Univ. Press 1990).

Primary Examiner—William L. Sikes
Assistant Examiner—Huy K. Mai
Attorney, Agent, or Firm—Watts Hoffmann Fisher & Heinke

[57] ABSTRACT

A light modulating apparatus comprising a liquid crystal light modulating material confined between substrates, elongated electrically-conductive paths supported on opposite sides of the light modulating material by the substrates and a pair of gating systems for supplying voltage pulses to the electrically conductive paths for addressing the light modulating material is disclosed. The light modulating material includes polydomains of polymer network dispersed in a chiral nematic liquid crystal having positive dielectric anisotropy. This material is confined by the substrates between inner surfaces treated to promote homogeneous alignment of the liquid crystal near the inner surfaces. The apparatus provides energy efficient passive control of a bistable light modulating material.

11 Claims, 3 Drawing Sheets

METHOD AND APPARATUS FOR ELECTRONIC SWITCHING OF A REFLECTIVE COLOR DISPLAY

STATEMENT OF GOVERNMENT INTEREST

The invention described herein was made in the performance of work under Cooperative Agreement No. DMR 89-20147 awarded by the National Science Foundation. The Government has certain rights in this invention.

TECHNICAL FIELD

This invention relates generally to liquid crystal technology, and more specifically to a method and apparatus for switching the optical mode of a light modulating material between two stable states.

BACKGROUND

In the early 1970's, several researchers proposed so-called liquid crystal "storage" displays in which an uninterrupted layer of chiral nematic liquid crystal was confined between substrates. Examples of such displays were proposed in U.S. Pat. No. 3,703,331 to Goldmacher et al., issued Nov. 21, 1972, and U.S. Pat. No. 3,821,720 to Greubel et al., issued Jun. 28, 1974. Both patents proposed switching the liquid crystal into, and out of, light scattering states by means of applied electric fields. According to these references, this provided a display which could be switched between stable light scattering and light transmissive states.

Though the light scattering phases in these devices were described as "stable" and did in fact persist after the removal of the switching field, the material would eventually relax into the light transmissive state. Consequently, such devices were not truly bistable in that the contrast between the light scattering and light transmissive portions of the display would decay with time and the display had to be refreshed if required to display information for a significant period of time. This is a disadvantage for applications such as signs for use in hotels, supermarkets or elsewhere, in which the display is expected to retain an image beyond the relaxation time of "storage" displays.

Another drawback to the use of these "storage" displays was that the electrical signal required to switch the material from the light transmissive to the light scattering state differed from the signal required to switch the material back from the scattering to the transmissive state, thereby requiring an electronic control capable of generating two different signals. In the display proposed by Goldmacher et al., the chiral nematic liquid crystal had negative dielectric anisotropy and the signal required to switch the material in the light scattering state differed from the signal required to reset the material to the light transmissive state by frequency rather than by voltage. While the display proposed by Greubel et al. used chiral nematic liquid crystal having positive dielectric anisotropy, the reference did not suggest any technique for modulating different portions of the display to form images.

There is a long felt need in the art for a truly bistable liquid crystal display having an energy-efficient switching system. Since the contrast of prior displays degraded or simply disappeared once the switching field was removed, image-forming displays required either a continuously applied electric field or a so-called "active matrix" capable of automatically refreshing the display at intervals short enough to maintain the desired contrast. On the other hand, the most efficient switching system for a truly bistable material would be a passive system capable of applying switching pulses to various portions of the display only when required to define or alter the image.

BRIEF DESCRIPTION OF THE INVENTION

This long felt need is met by a light modulating apparatus comprising a liquid crystal light modulating material confined between substrates, elongated electrically-conductive paths supported on opposite sides of the light modulating material by the substrates and a pair of gating systems for supplying voltage pulses to the electrically conductive paths. The light modulating material includes polydomains of polymer network dispersed in a chiral nematic liquid crystal having positive dielectric anisotropy. This material is confined by the substrates between inner surfaces treated to promote homogeneous alignment of the liquid crystal near the inner surfaces. As a result of the synergistic interaction of these conditions, the material aligns a stable colored reflective mode during trailing edges of at least some voltage pulses having amplitudes no less than a reference reset voltage $V_R$, and aligns in a stable scattering mode during the rising edges of pulses having amplitudes no less than a reference switching voltage $V_S$ and less than the reference voltage $V_R$.

The role of the substrates is to confine the liquid crystal, define the inner surfaces and provide support for the display. The substrates may stand alone with appropriate spacers and gasketing material to define a space for the light modulating material, or the substrates may be part of a larger structure. Each of the substrates supports a series of the elongated electrically conductive paths, which together generate the switching field across the light modulating material. In a preferred embodiment, the electrically-conductive paths on at least one of the surfaces of the inner surfaces are formed from a transparent conductor such as indium-tin oxide and are covered by an alignment material which protects the electrically-conductive paths and light modulating material from direct contact.

One of the substrates supports a series of scanning line paths on one side of the light modulating material. The other substrate supports a series of segment line paths on an opposite side of the light modulating material. The segment line paths are skew, that is, spaced and non-parallel, with respect to the scanning line paths and preferably the segment line and scanning line paths run in mutually perpendicular directions to define an X-Y array of picture elements. Since the apparatus is bistable, the contrast ratio of the image is independent of the number of scanning lines.

Voltages are directed along the segment line and scanning line paths by a pair of gating systems, one of which communicates with the scanning line paths and the other of which communicates with the segment line paths. In a preferred embodiment, the gating systems communicate with the electrically conductive paths through amplifiers. The gating systems may be separate devices, or may be combined together in a single integrated circuit.

A first gating system, which coupled to the scanning line paths, is designed to enable a steady voltage $V_{12}$ along each of the remaining scanning line paths, and to enable a scanning voltage pulse of amplitude $V_P$ superimposed on the constant voltage $V_{12}$ to each scanning line path sequentially. The second gating system, which is coupled to the segment line paths, is designed to enable either a voltage $V_{21}$ or a voltage $V_{22}$ along one of the segment line paths synchronously with the scanning pulse. When these voltages satisfy the following relations:

i) $|V_{21}-V_{12}|<V_S$;

ii) $|V_{22}-V_{12}|<V_S$;

iii) $V_S<|V_{21}-V_{12}-V_P|<V_R$; and iv) $|V_{22}-V_{12}-V_P|>V_R$;

no switching occurs along any scanning line path supplied with the voltage $V_{12}$. Those picture elements along a scanning line path supplied with a voltage pulse of amplitude $V_{11}=V_{12}+V_P$ and along a segment line supplied with a synchronous voltage $V_{21}$ will switch (or remain) in the light scattering state. Alternatively, those picture elements along a scanning line path supplied with a voltage pulse of amplitude $V_{11}$ and along a segment line supplied with a synchronous voltage $V_{22}$ will reset to (or remain in) the colored reflecting state on the trailing edge of the first removed of the scanning pulse.

This display is made possible by a recent and significant development in the field of liquid crystal display technology, namely "polymerstabilized chiral nematic" multistable liquid crystal displays. Such displays are discussed in greater detail in co-pending U.S. patent application Ser. No. 07/694,840, filed on May 2, 1991, which is incorporated by reference. These devices can be driven between reflective, scattering and transmissive states by means of external electric fields. In the refractive state, the material reflects one color of light and appears colored to an observer on the incident side of the display. In the scattering state, the material scatters light and appears dark and opaque. In the transmissive state, the display appears transparent.

The scattering and reflective states remain stable at zero field. If an electric field of moderate strength is pulsed across the material while in the reflective state, the material converts into the scattering state. The application of a strong electric field pulse, i.e., an electric field strong enough to homeotropically align the liquid crystal directors, drives the material to the transmitting state. If the field is turned off quickly, the material reforms to the light reflecting state. Switched off slowly, the material returns to the light scattering state. This permits the material to be switched from the colored reflective mode to the dark scattering mode and then erased by the application of appropriate external electric fields. The colored reflective and light scattering states are truly stable in the sense that once the material is switched to one of these states by an electric or magnetic field, it will remain in that state indefinitely after the removal of the field.

Light modulation by means of polymer-stabilized chiral nematic liquid crystal material results from a synergistic interaction of chiral liquid crystal, polymer and alignment materials at the boundaries of the liquid crystal. Polymer-stabilized chiral nematic liquid crystal devices include light modulating material comprising phase-separated polydomains of polymer network dispersed in a chiral nematic liquid crystal having positive dielectric anisotropy. The polymer is present in an amount less than 10% by weight based on the combined weight of chiral liquid crystal and polymer. The liquid crystal molecules in the vicinity of the polydomains are preferentially oriented and are anchored by the polymer network so as to be less responsive to an applied field than the surrounding liquid crystal molecules whose orientation is strongly influenced by field conditions. The alignment material acts on the outer boundaries of the liquid crystal to preferentially orient the liquid crystal in a twisted planar structure in the absence of an electric field. The interaction of these boundary conditions with the distortions occasioned by external electric fields gives rise to the different optical states, i.e., scattering, reflective and transmissive.

The monomeric material used to form the polymer networks is soluble with the chiral nematic liquid crystal and phase separates upon polymerization to form ordered polymer networks. Examples of useful monomers have at least two polymerizable double bonds so as to be cross-linkable, and include bisacrylates and the like. The chiral nematic liquid crystal is a mixture of nematic liquid crystal having positive dielectric anisotropy and chiral material in an amount sufficient to produce a desired pitch length.

The solution of chiral nematic liquid crystal and polymer preferably contains a small amount of photo-initiator. In carrying out the invention, the solution is introduced into a cell, having its walls treated in any suitable manner to provide for surface alignment of the liquid crystal molecules parallel to the cell walls. The cell walls may, for example, be provided with rubbed polyimide layers or treated with detergent or chemicals, etc., all as is known in the art. Polymerization is initiated in any suitable manner, as by UV radiation. Under polymerization conditions, the polymer phase separates from the chiral nematic liquid crytal and forms polydomains or networks which, in the more preferred embodiments, consist of cross-linked polymer molecules. The liquid crystal molecules in proximity to the polydomains are preferentially oriented and are anchored by the polymer network.

The chiral nematic liquid crystal has a pitch length in a preferred range of from about 0.25 to 0.44 microns effective to reflect circularly polarized colored light. Typical pitch lengths are 0.27 microns for blue color, 0.31 microns for green color and 0.40 microns for red color. Multistable color display materials have been prepared containing from about 27 to 48% chiral material based on the combined weight of nematic liquid crystal and chiral material, and from about 1.0 to about 4.5% polymer based on the combined weight of the chiral nematic liquid crystal mixture and polymer. The ranges can vary, however, depending upon the chiral material, liquid crystal and the polymer which are used. The multistable color display of cells are prepared by phase separating and polymerizing the liquid crystal-polymer solution with UV radiation, either in zero field or in a field effective to align the liquid crystal directors. In both instances, the polymer networks that are created in the material serve to stabilize the scattering and reflective states.

In the field-OFF condition with the liquid crystal molecules in a twisted planar ("Grandjean") texture parallel to the cell walls, the cell in a colored light reflecting state. This state can be made to appear as green, red, blue, or any pre-selected color depending upon the pitch length of the chiral nematic liquid crystal. When a low electric field, e.g. 6 volts per micron of thickness, is applied to the cell, it will switch to an opaque, light scattering state. In this state, the liquid crystal molecules surrounding the polydomains have a focal conic texture as a result of the competition of the surface aligning effect, the electric field and the constraint of the polymer networks. The material will remain in the light scattering state when the low electric field is removed. If a higher electric field, e.g. 12 volts per micron of thickness, is applied to the cell, the material becomes optically clear until the voltage is removed. If the electric field is turned off quickly, the material switches to the uniform twisted planar structure which has the pre-selected color dictated by the pitch length. The light reflecting state remains stable at zero field condition. If the field is turned off slowly, the material changes to its light scattering state which also remains stable at zero field condition.

It has been discovered that polymer-stabilized chiral nematic devices can be made to exhibit a continuous spectrum of optical states characterized by increasing degrees of scattering as increased voltages are applied below the threshold for transition to the purely scattering (focal conic) state. Each of these intermediate optical states is stable. Nonetheless, while polymer stabilized chiral nematic materials are characterized by multistability, the most significant states in terms of the present invention will be the colored reflective and light scattering states at either end of the spectrum. Nonetheless, since the apparatus is bistable, there is no need to "refresh" the elements of the display, so that switching need only occur when it is desired to change displayed image. Since the material switches from the light transmissive mode to the light scattering or colored reflective mode on the trailing edge of a pulse of sufficient amplitude to shift the material to the light transmissive mode (that is, greater than $V_R$), it is desirable that the voltages on the segment line paths not be switched while a voltage pulse of $V_{11}$ is being supplied to one of the scanning line paths.

In an alternative embodiment, a voltage pulses of a third amplitude, $V_{23}$, may be supplied to the segment line paths if it is desired to simply leave an element along a line unchanged, regardless of its current optical mode. The voltage $V_{23}$ must satisfy two constraints:

i) $|V_{23} - V_{12}| < V_S$; and
ii) $|V_{23} - V_{11}| < V_S$.

The use of the additional voltage $V_{23}$ would permit individual elements of the display to be switched without disturbing other elements on the same display line. On the other hand, the two constraints on $V_{23}$ concurrently place an additional constraint on $V_{11}$ and $V_{12}$ which would require additional care in the design and set-up of the apparatus. Another drawback is that conventional digital electronics typically manipulates two signal voltages comfortably, but is not well adapted to manipulate signals of three different voltage levels.

While the invention is most useful in connection with a bistable or multistable material such as polyer-stabilized chiral nematic material or, perhaps, a bistable ferroelectric material, it may also be used in connection with light modulating materials which are not stable. In this case, the sequence of pulses applied to the scanning lines must be repeated periodically to refresh the material. Examples of materials with which the invention may be used are the "normal mode" and "reverse mode" materials disclosed in U.S. patent application Ser. No. 07/694,840, previously incorporated by reference.

One advantage of this invention is that it provides for line-at-a-time addressing which minimizes cross-talk and thereby improves contrast for low or high definition flat panels or displays. Many additional features, advantages and a fuller understanding of the invention will be had from the following detailed description of preferred embodiments and the accompanying drawings.

DETAILED DESCRIPTION OF THE PREFERRED EMBODIMENT

Figure 1:
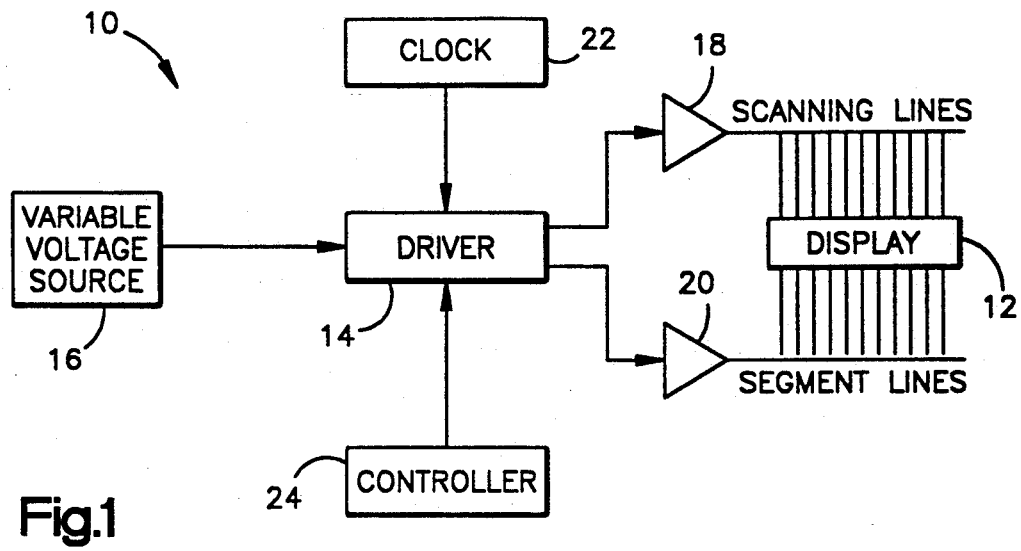
FIG. 1 is a block diagram of a display device according to the invention.

A light modulating apparatus embodying the invention is shown at 10 in FIG. 1. The apparatus 10 consists of a display 12; a driver 14; a variable voltage supply 16; two amplifiers 18, 20; a clock 22 and a controller 24. The preferred display 12 is of the polymer-stabilized chiral nematic type. The driver 14 provides control signals to the display 12 which control the manner in which the display 12 modulates light. The voltages of these control signals are determined by the output of the variable voltage supply 16. The pattern addressed by the driver 14 may be preprogrammed in the controller 24.

Figure 2:
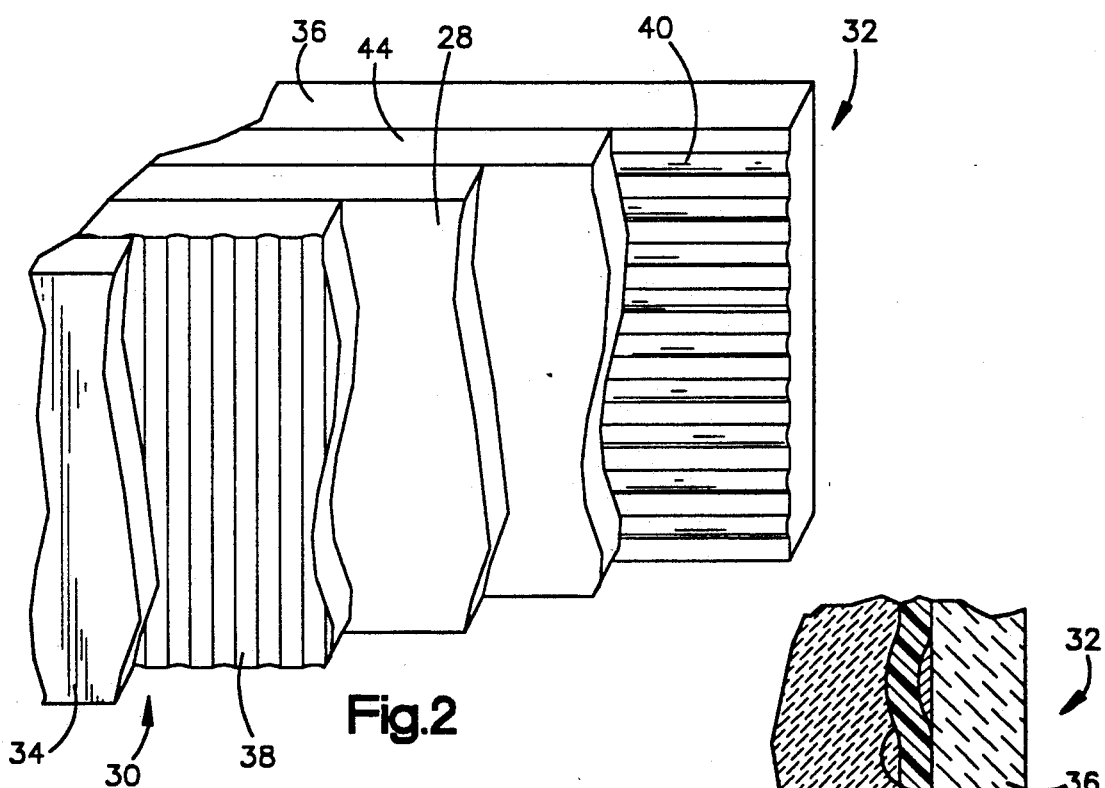
FIG. 2 is a perspective cut-away view of a display for use in a display device according to the invention.
Figure 3:
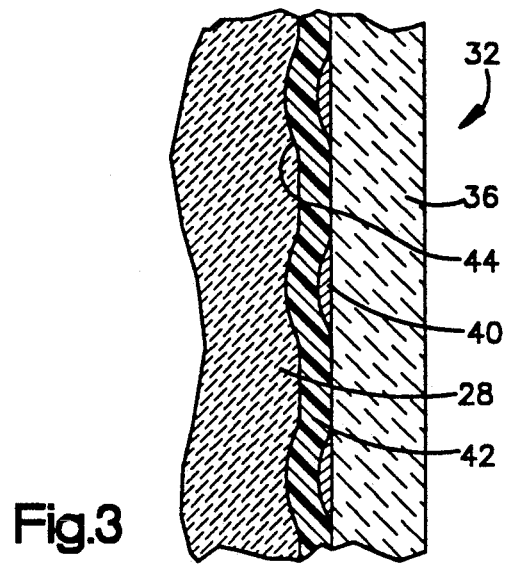
FIG. 3 is a cross-sectional view of a portion of the display.

The preferred display 12 is of the polymer-stabilized chiral nematic type. The display consists of a light modulating material 28 (FIG. 3) confined between two substrates 30 and 32. As best shown in FIGS. 2 and 3, the substrates 30, 32 include a pair of glass plates 34, 36. Elongated electrically-conductive paths 38, 40 of indium-tin oxide are deposited on facing sides of the glass plates 30, 32. In the embodiment shown in FIG. 2, "segment line" paths 38 and "scanning line" paths line paths 40 are shown. These segment line paths 38 and scanning line paths 40 are mutually skew and perpendicular in direction so as to define an X-Y array of picture elements on the display. As best illustrated in FIG. 3, an alignment layer (only one, 42, shown) is coated over the electrical paths 38, 40 on each substrate 30, 32 and buffed to promote homogeneous alignment of liquid crystal in the light modulating material 28 near inner surfaces (only one, 44, shown) of the substrates 30, 32.

A light modulating material 28 is formed between the substrates 30, 32 by depositing a solution of photopolymerizable monomer in chiral nematic liquid crystal in the gap between the inner surfaces of the substrates (one shown at 44) defined by 5 μm glass spacers (not shown) and polymerizing the monomer to form polydomains of polymer network in the liquid crystal. One such solution is formed by mixing 59.0% E31 nematic liquid crystal, 19.2% CB15 cholesteric liquid crystal, 19.2% CE2 cholesteric liquid crystal, 1.9% 4,4'-bisacryloyl-biphenyl monomer and 0.6% BME photo-initiator, all percentages based on mass of the final mixture. (The three liquid crystals are available from BDH Chemical Ltd. and the photo-initiator, from Polyscience Co.) Once deposited between the substrates, the solution is irradiated by ultraviolet light for 1 hour to polymerize the monomer, thereby separating a network of cross-linked polymer from solution in the liquid crystal. When the outer surface of the rear substrate 32 is painted black, the display 12 reflects green light in the colored reflective state and is black in the light scattering state. While the display 12 itself is multistable in the sense of having a continuous spectrum of topical states between the colored reflective and light scattering, the apparatus 10 is bistable in that only the colored reflective and light scattering states of the display 12 are used.

Figure 4:
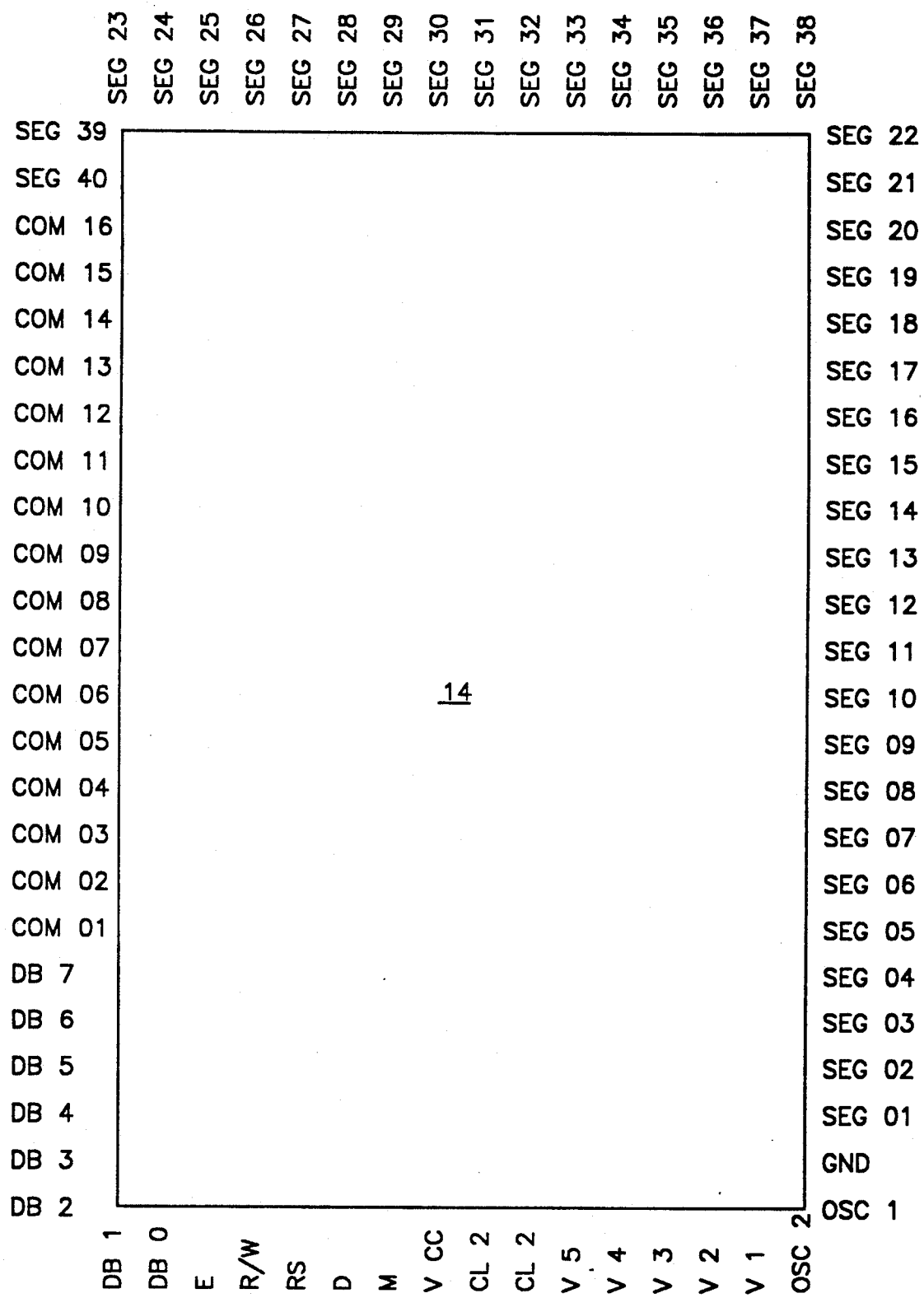
FIG. 4 is a pin diagram for an HD44780 CMOS dot matrix driver integrated circuit, available from Hitachi American Ltd., which is used as an LCD driver in a preferred embodiment of the invention.

The driver 14 communicates with the segment line paths 38 and scanning line paths 40 to generate voltage pulses across the light modulating material. The preferred driver comprises an HD44780 CMOS dot matrix driver integrated circuit available from Hitachi America Ltd. of Brisbane, Calif. A pin diagram for the HD44780 IC is shown in FIG. 4. The HD44780 integrated circuit includes a first gating system coupled to the "COM" pins for enabling output signals through these pins. The circuit also includes a second gating system for enabling output signals through the "SEG" pins. The amplitudes of these signals are determined by voltage levels supplied through pins "$V_1$"–"$V_5$" by the variable voltage source 16. The integrated circuit also includes internal read-only memory which permits the circuit to translate four-bit or eight-bit digital signals into appropriate outputs through the gating systems to display alphanumeric characters identified by the digital inputs in 5×7 dot matrices. (In a preferred embodiment, there are forty segment line paths and nine scanning line paths. Seven of the scanning line paths are used to define the seven rows of the characters, while the eight line is used to define a cursor.)

In the preferred embodiment, the "SEG" pins of the IC supply voltage pulses to the segment line paths 38, while the "COM" pins supply voltage pulses to the scanning line paths 40. Voltage pulses supplied to a selected one of the segment line paths 38 and a selected one of the scanning line paths 40 generate local voltage differences across that portion of light modulating material 28 where the selected scanning line and segment line paths cross.

Since the HD44780 integrated circuit is a low power device with a common voltage level $V_{CC}$ of 5 volts, the output signals from the driver 14 must be amplified in order to provide the threshold voltages necessary to switch and reset the preferred light modulating material 28. When a voltage pulse of 31 volts is supplied across a portion of the light modulating material, the material switches on the leading edge of the pulse to the light scattering state. When a voltage pulse of 52 volts is applied across the material, the material switches on the leading edge of the pulse to a light transmissive state. If the trailing edge of the pulse is sufficiently sharp, the material resets to the colored reflective state on the trailing edge. A pulse having an amplitude as high as 10 volts has no effect on the optical state of the material. In the preferred embodiment, amplifiers 18, 20 (preferably operational amplifiers) are provided to increase the voltage of signals output from the driver 14 by a factor of sixteen in order to obtain pulses having amplitudes above the switching and resetting thresholds.

Figure 5:
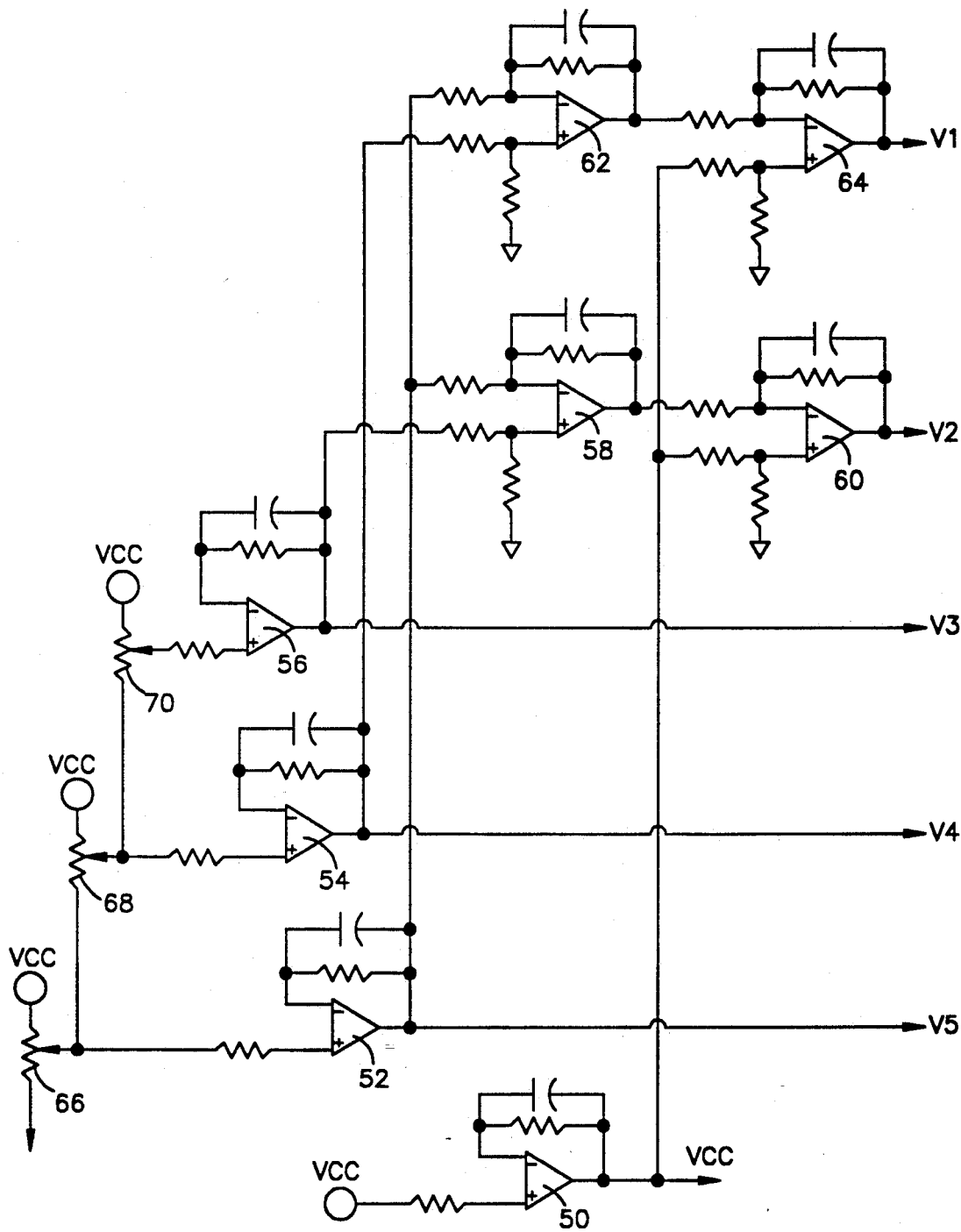
FIG. 5 is a schematic diagram of a variable voltage supply used in a preferred embodiment of the invention.

The driver 14 receives power from the variable voltage supply 16, best shown in FIG. 5. The variable voltage supply 16 comprises a network of operational amplifiers 50, 52, 54, 56, 60, 62, 64 which divide a supply voltage $V_{CC}$ (which for the HD44780 integrated circuit is 5 volts) into voltages $V_1$, $V_2$, $V_3$, $V_4$ and $V_5$. The voltage level $V_{CC}$ is supplied to variable resistors 68, 70, 72 and through the buffer 50 to the driver 14. Variable resistors 66, 68, 70 generate voltage levels $V_3$, $V_4$ and $V_5$, which are supplied through buffers 52, 54, 56 to corresponding pins on the driver 14. The voltage level $V_5$ is also supplied to the inverting inputs of differential amplifiers 58 and 62, and subtracted from voltages $V_3$ and $V_4$. The differences $V_3-V_5$ and $V_4-V_5$ are then supplied to the inverting inputs of differential amplifiers 60 and 64 and substracted from $V_{CC}$ to supply voltages $V_1 = V_{cc} - (V_4 - V_5)$ and $V_2 = V_{CC} - (V_3 - V_5)$ to corresponding pins on the driver 14. In a preferred embodiment, the variable resistors 66, 68, 70 are set so that:

$$16(V_{CC} - V_5) = V_R = 52 \text{ volts};$$

$$16(V_{CC} - V_4) = 4/5\ V_R;$$

$$16(V_{CC} - V_3) = 3/5\ V_R = 31 \text{ volts};$$

$$16(V_{CC} - V_2) = 2/5\ V_R; \text{ and}$$

$$16(V_{CC} - V_1) = 1/5\ V_R = 10 \text{ volts},$$

where $V_R$ is the threshold voltage for a pulse capable of resetting the display from the light scattering to the colored reflective mode at the pulse's trailing edge.

In operation, the first and second gating systems control the modulation of light by the display 12 by enabling signals along the segment line and scanning line paths 38, 40. A constant voltage of either $V_1$ or $V_4$ relative to ground is supplied through each of the "COM" pins of the driver 14, thereby inducing a constant voltage along the scanning line paths 40. In addition, the first gating system enables pulses of amplitude $V_{CC}$ or $V_5$ relative to ground through each "COM" pin line path while maintaining the voltage through the remaining "COM" pins at $V_1$ or $V_4$, thereby inducing scanning voltage pulses sequentially along the scanning line paths 40. As each scanning line is pulsed, one of two voltage is synchronously enabled along the each of the segment line paths 38, the choice of which of the two voltages depending on whether the material is to locally reflect or scatter light.

Which two voltage levels are to be modulated on the segment line paths 38 depends on the amplitudes of the pulses on the scanning line paths 40:

| DESIRED STATE | SCANNING SIGNAL | SEGMENT SIGNAL | VOLTAGE ACROSS MATERIAL |
| --- | --- | --- | --- |
| Reflecting State | $V_{CC}$ | $V_5$ | $16(V_{CC} - V_5) =$ 52 volts |
|  | $V_5$ | $V_{CC}$ | $16(V_5 - V_{CC}) =$ −52 volts |
| Scattering State | $V_{CC}$ | $V_3$ | $16(V_{CC} - V_3) =$ 31 volts |
|  | $V_5$ | $V_2$ | $16(V_5 - V_2) =$ −31 volts |
| Scanning Line Not Pulsed | $V_1$ | $V_{CC}$ | $16(V_1 - V_{CC}) =$ −10 volts |
|  | $V_1$ | $V_2$ | $16(V_1 - V_2) =$ 10 volts |
|  | $V_4$ | $V_5$ | $16(V_4 - V_5) =$ 10 volts |
|  | $V_4$ | $V_3$ | $16(V_4 - V_3) =$ −10 volts |

For example, if the scanning line paths 40 are supplied with constant voltage $V_4$ and sequentially pulsed up to voltage $V_{CC}$ relative to ground (that is, a pulse of amplitude $V_{CC}-V_4$ was superimposed on a constant voltage $V_4$), a portion of the light modulating material would be switched to the scattering state by switching a voltage $V_3$ toward the corresponding segment line path. The same portion of the light modulating material would be reset to the colored reflective state by switching a voltage $V_5$ toward the same segment line path.

The clock 22 provides control over the length of the pulses enabled by the first gating system. While the preferred driver 14 has an internal oscillator which could be used to determine the pulse length, the use of an external clock permits the operator to vary the pulse length in order to optimize switching. A preferred scanning pulse length for the polymer-stabilized chiral nematic material described above is approximately 10 milliseconds.

The controller 24 permits the information to be displayed by apparatus to be preprogrammed. A preferred controller 24 is a programmable read-only memory ("PROM") which can be addressed by the driver 14. The PROM supplies a series of 8-bit digital signals to the driver 14 which specify the characters to be displayed on the display 12.

Many changes and modifications of the invention will be apparent to those skilled in the art in light of the foregoing detailed disclosure. Therefore, within the scope of the appended claims, it is to be understood that the invention can be practiced other than as specifically shown and described.

We claim:

1. Bistable light modulating apparatus comprising:
   a) a light modulating material including polydomains of polymer network dispersed in a chiral nematic liquid crystal having positive dielectric anisotropy;
   b) substrates confining the light modulating material between parallel inner surfaces treated to promote homogeneous alignment of the chiral nematic liquid crystal near the inner surfaces, whereby
      i) the material aligns in a reflective mode during trailing edges of at least some voltage pulses having amplitudes no less than a reference voltage $V_R$, and
      ii) the material aligns in a scattering mode during rising edges of pulses having amplitudes no less than a reference voltage $V_S$ and less than the reference voltage $V_R$;
   c) elongated electrically-conductive scanning line paths supported on one side of the light modulating material by one of the substrates;
   d) elongated electrically-conductive segment line paths skewed with respect to the scanning line paths and supported by another of the substrates on an opposite side of the light modulating material;
   e) a first gating system in electrical communication with the scanning line paths for enabling a constant voltage $V_{12}$ along each of the scanning line paths and sequentially enabling a scanning voltage pulse of amplitude $V_P$ superimposed on the constant voltage $V_{12}$ along each scanning line path; and
   f) a second gating system in electrical communication with the segment line paths for enabling a voltage $V_{21}$ or a voltage $V_{22}$ to at least one of the segment line paths synchronously with the scanning pulse;
   g) wherein the amplitudes of the pulses enabled by the first and second gating systems satisfy the relationships
      i) $|V_{21}-V_{12}|<V_S$;
      ii) $|V_{22}-V_{12}|<V_S$;
      iii) $V_S<|V_{21}-V_{12}-V_P|<V_R$; and
      iv) $|V_{22}-V_{12}-V_P|<V_R$.

2. Apparatus according to claim 1 wherein either the scanning line or segment line paths are composed of a transparent electrically-conductive material.

3. Apparatus according to claim 1 wherein the scanning line paths are elongated in a direction perpendicular to a direction in which the segment line paths are elongated.

4. Apparatus according to claim 1 wherein the first and second gating systems are combined in a single integrated circuit.

5. Apparatus according to claim 1 including an amplifier coupled between the first gating system and at least one of the scan line paths for generating the voltage $V_{12}$ and superimposed voltage pulses of amplitude $V_P$ in response to signals enabled by the first gating system.

6. Apparatus according to claim 1 including an amplifier coupled between the second gating system and at least one of the segment line paths for generating a voltage $V_{21}$ or $V_{22}$ in response to signals enabled by the second gating system.

7. Apparatus according to claim 1 including a variable voltage supply for defining and supplying to the first and second gating systems voltages equal or proportional to $V_{12}$, $V_{12}+V_P$, $V_{21}$ and $V_{22}$.

8. Apparatus according to claim 1 including a control circuit having memory for determining which segment line paths are to be enabled with the voltage $V_{21}$ for locally aligning a portion of the light modulating material the scattering mode and which segment line paths are to be enabled with the voltage $V_{22}$ for locally aligning a portion of the light modulating material in the reflective mode.

9. A method for controlling the modulation of light by a light modulating material having visually distinguishable first and second optical states wherein the material is switched from the first optical state to the second optical state by means of a voltage pulse having an amplitude no less than a reference voltage $V_S$ and less than a voltage $V_S$, and reset from the second optical state to the first optical state by eans of a voltage pulse having an amplitude no less than $V_R$, comprising the steps of:
   a) confining the light modulating material in a space between two planes, one of which planes includes a set of parallel scanning lines and the other of which planes includes a set of parallel segment lines skew to the scanning lines;
   b) supplying a reference voltage $V_{12}$ along each scanning line;
   c) superimposing a scanning voltage pulse having an amplitude $V_P$ along one of the scanning lines; and
   d) supplying along each segment line a voltage $V_{21}$ or $V_{22}$ synchronously with the scanning voltage pulse, wherein these voltages and amplitudes satisfy the relationships
      i) $|V_{21}-V_{12}|V<V_S$;
      ii) $|V_{22}-V_{12}|<V_S$;
      iii) $V_S<|V_{21}-V_{12}-V_P|<V_R$; and
      iv) $|V_{22}-V_{12}-V_P|>V_R$.

10. A method according to claim 9 including the additional steps of superimposing a scanning pulse having the amplitude $V_P$ sequentially along each scanning line and synchronously supplying along each segment line a segment voltage pulse synchronous with the scanning voltage pulse having an amplitude of either $V_{21}$ or $V_{22}$ to at least one of the segment lines, thereby addressing an entire viewing area of the light modulating material.

11. Light modulating apparatus comprising:
   a) a light modulating material having visually distinguishable stable first and second optical states wherein the material is switched from the first optical state to the second optical state by means of a voltage pulse having an amplitude no less than a reference voltage $V_S$ and less than a voltage $V_R$, and reset from the second optical state to the first optical state by means of a voltage pulse having an amplitude no less than $V_R$;
   b) elongated electrically-conductive scanning line paths supported on one side of the light modulating material;
   c) elongated electrically-conductive segment line paths skewed with respect to the scanning line paths and supported on an opposite side of the light modulating material;
   e) a first gating system in electrical communication with the scanning line paths for enabling a constant voltage $V_{12}$ along each of the scanning line paths and sequentially enabling a scanning voltage pulse of amplitude $V_P$ superimposed on the constant voltage $V_{12}$ along each scanning line path; and
   f) a second gating system in electrical communication with the segment line paths for enabling a voltage $V_{21}$ or a voltage $V_{22}$ to at least one of the segment line paths synchronously with the scanning pulse;
   g) wherein the amplitudes of the pulses enabled by the first and second gating systems satisfy the relationships
      i) $|V_{21} - V_{12}| < V_S$;
      ii) $|V_{22} - V_{12}| < V_S$;
      iii) $V_S < |V_{21} - V_{12} - V_P| < V_R$; and
      iv) $|V_{22} - V_{12} - V_P| > V_R$.

* * * * *